United States Patent [19]

Bengnar et al.

[11] 4,289,983

[45] Sep. 15, 1981

[54] ENCODER FOR MONITORING BIDIRECTIONAL MOTION

[75] Inventor: Lutz H. O. Bengnar; Wallace E. Kee; Raymond D. Mathews; Stephen T. Olson, all of Austin, Tex.

[73] Assignee: International Business Machines Corporation, Armonk, N.Y.

[21] Appl. No.: 53,650

[22] Filed: Jun. 29, 1979

[51] Int. Cl.³ .............................................. H02K 37/00
[52] U.S. Cl. ................................. 310/49 R; 318/685; 318/696
[58] Field of Search ........................... 310/49, 67, 46; 318/138, 259, 685, 696

[56] References Cited

U.S. PATENT DOCUMENTS 3,324,369 6/1967 Markakis ............................. 318/138
4,024,446 5/1977 Burnett ............................... 318/685

Primary Examiner—Donovan F. Duggan
Attorney, Agent, or Firm—J. B. Kraft

[57] ABSTRACT

The present disclosure involves a rotational encoder having a plurality of indicia at fixed positions with respect to each other, means for rotating said indicia about an axis and means for sensing the indicia positioned along the path of rotation of said indicia. In the present apparatus, each of a plurality of said indicia has a first edge radial to said axis and traversing the path of rotation and a second edge nonradial to the axis also traversing the path of rotation and the apparatus further includes means for moving the sensing means so that the position of the sensing means may be adjusted with respect to the first edges which are the leading edges when said indicia are rotated in one direction and to the second edges which are the leading edges when the indicia are rotated in the opposite direction.

23 Claims, 10 Drawing Figures

CELL 72
AT ORIGINAL
POSITION

CELL 72
AT ALTERNATE
POSITION

ENCODER FOR MONITORING BIDIRECTIONAL MOTION

BACKGROUND OF THE INVENTION

The present invention relates to encoders and more particularly to rotational encoders which are useful in closed loop step motor control systems.

In recent years, there has been an increasing demand for high speed step motors in technologies such as high speed printers where step motors are used both in the escapement and character selection apparatus. Open loop control of step motors has the disadvantage that the motor may not be able to follow the input pulse train with sufficient accuracy that the maximum speed which the motor can be operated at is limited. In addition, maximum efficiency cannot be achieved with open loop control. Closed loop step motor systems are directed at overcoming these disadvantages by using positional feedback to the step motor to determine the proper rotor position at which phase switchings of the motor may occur. Thus, closed loop controlled step motor systems appear to be the approach that the field is taking at the present time towards the achievement of higher speed, stability and efficiency in step motor operations. Conventionally, the feedback sensors used in closed loop step motor control systems are optical devices or magnetic devices which provide pulses proportional to the rotation of the step motor.

Conventional encoders used to provide the requisite step motor system feedback may be slotted disks mounted on the shaft of the step motor so as to rotate in synchronization with step motor. Associated with the slotted disk are sensing means comprising a source of light on one side of the disk and a photosensor on the other side for detecting the absence or presence of a slot through the sensing of transmitted light. Of course, in such step motor systems, the position of the photosensor and consequently the timing of the sense pulse with respect to the step position is a very critical aspect of feedback control of the step motor. The slots in the encoder disk are conventionally uniformly spaced and equal in number to the number of steps per revolution of the motor. Consequently, each time a slot passes through the beam from the light source to the photosensor, a pulse is generated by the photosensor and fed back to the control system of the step motor.

In the operation of such encoders, the sensing means are adjusted to a fixed angle which may be referred to as the "lead angle" or the "switching angle" with respect to the detent or equilibrium position of the motor. The lead angle is in effect the number of degrees in advance of (in lead of) a given detent position from which the corresponding phase is sensed and consequently switched. Consequently, the speed of a step motor is directly related to the lead angle.

In the case of some encoders having slots or other rectilinear indicia, the lead angle may be set by adjusting the position of the sensing means or the indicia being sensed with respect to a given motor detent position. In cases where the step motor travels in only one direction, the means for adjusting the position of the sensing means with respect to the leading edges of the slot are relatively straight forward. Usually a single sensing means may be utilized. On the other hand, if the step motor is to be a bidirectional step motor and particularly high speed bidirectional step motor which requires accurate lead angle adjustments in both directions, the problem of lead angle adjustment becomes more complex. It should be noted that where the closed loop feedback system is a common one pulse per step system, i.e., the encoder disk has only one slot per step, it is still very difficult and less than fully accurate to optimize a bidirectional closed loop system. As will be described hereinafter in greater detail with respect to the drawings of the prior art, this is accomplished by positioning each encoder slot at the center equidistant from its two adjacent motor detent positions. This provides an equal lead angle for either direction equivalent to half a step provided the sensing indicia is of negligible width.

However, where the lead angle in either or both directions is to be some value other than a half step, this single sensing means apparatus will be substantially inoperative.

A standard approach in the present technology towards the solution of the above problem is to use dual sensing means, i.e., a first sensor positioned to monitor encoder disk when the step motor shaft is rotating in one direction and a second sensor for monitoring the encoder disk when it is rotating in the reverse direction. However, this approach requires additional equipment and is more complex and expensive than monitoring by a single sensing means.

Similar problems are encountered with linear step motors when such linear step motors are operated in the bidirectional mode.

BRIEF DESCRIPTION OF THE PRESENT INVENTION

Accordingly it is the primary object of the present invention to provide an encoder capable of consistently sensing the extent of bidirectional motion.

It is another object of the present invention to provide a rotational encoder, the sensing means of which are adjustable so that the extent of rotation may be sensed irrespective of the direction of rotation.

It is a further object of the present invention to provide a closed loop bidirectional step motor system having means for consistently sensing and/or setting the extent of motion or lead angle irrespective of the direction of travel.

It is yet another object of the present invention to provide a closed loop bidirectional step motor system having means for adjusting the position of sensing means so that lead angles may be independently adjusted irrespective of the direction of rotation of the step motor.

It is even a further object of the present invention to provide a closed loop bidirectional step motor system utilizing a single sensing means capable of accurately determining the extent of stepping of the motor irrespective of the direction of motion.

The present invention accomplishes the above objects by improving standard rotational encoders which have a plurality of indicia at fixed positions with respect to each other, means for rotating the indicia about an axis and means for sensing the indicia. The improvement involves using indicia such as slots which have a first edge radial to said axis of rotation and a second edge non-radial to the axis. In addition means for adjusting the sensing means are provided so that the sensing means may be adjusted with respect to the first edge which would be the leading edge when the indicia are rotated in one direction and with respect to the second edges which would be the leading edges when the indicia rotated in the opposite direction. With this type of indicia structure, the means for adjusting the position of the sensing means may conveniently comprise means for moving the sensing means radially to the axis in order to vary the position of the sensing means with respect to the second edges and means for moving the sensing means in an arc concentric with the path of rotation of the encoder in order to vary the position of the sensing means with respect to the first edges.

In this manner, a single sensing means may be independently adjusted with respect to the first and second indicia edges. Thus, the rotational encoder when used in a closed loop bidirectional step motor system provides a single simple sensing means in which the lead angle is easily adjusted for each direction of rotation of the system without affecting the lead angle adjustment for the opposite direction.

In accordance with an alternate aspect of the present invention, neither indicia edge need to be radial to the axis of rotation. In such a case, the indicia edges must be non-parallel. Therefore, a single sensing means may be used to adjust lead angle which would then remain consistent irrespective of the direction of rotation of the step motor.

It should be clear that the principles of the present invention as applicable to closed loop rotational step motors are equally applicable to closed loop linear step motors. In such linear step motors, a single sensing means may be similarly utilized to sense the extent of motion irrespective of the direction of travel. Since conventional linear step motors use a linear slotted strip or tape which moves in synchronization with the linear movement of the step motor in place of the rotation of slotted disk, the slots in the linear tape may have a configuration identical to the novel slots in the encoder disk in the present invention. Thus, in the linear tape configuration, the tape would have a series of equally spaced identical slots each having a first edge perpendicular to the linear path of travel and a second edge non-perpendicular to this path of travel which would preferably intersect the first edge of the slot. In actuality, this configuration would be substantially identical to the configuration of the slots in the rotational disk since first edges of the slots in the rotational disk are radial to the axis of rotation. Consequently, they are in effect perpendicular to the path of rotation.

BRIEF DESCRIPTION OF THE DRAWINGS

Referring now to the drawings, wherein a preferred embodiment of the invention is illustrated, and wherein like reference numerals are used throughout to designate like parts.

DESCRIPTION OF THE PREFERRED EMBODIMENTS

Figure 1:
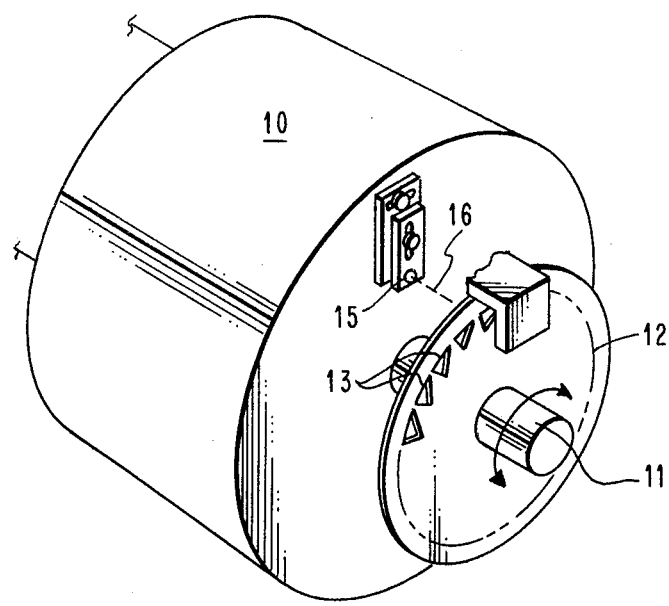
FIG. 1 is a generalized diagrammatic view of the apparatus of the present invention with part of the support means broken away so as to expose the sensing means.
Figure 2:
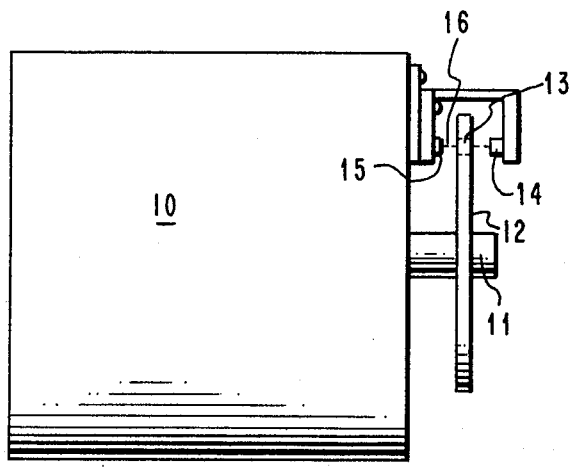
FIG. 2 is a diagrammatic side view of the apparatus of FIG. 1.

With reference to FIGS. 1 and 2, the apparatus to which the improvements of the present invention apply will be described in general. A bidirectional step motor 10, the details of which need not be shown, rotates step motor shaft 11 through a series of steps in either a clockwise or counterclockwise direction. The step motor operates in a standard closed loop system involving positional feedback to the motor to determine appropriate rotor positions at which phase switching of the motor may occur. The encoder which provides the requisite information which is fed back to the system comprises encoder disk 12 comprising a plurality of uniform slots 13 equidistant from each other. Light source 14 on one side of disk 12 emits light which is sensed by photosensing means such as photoelectric cell 15 whenever the slot 13 crosses light path 16 to thereby permit the transmission of light along this path from light source 14 to photoelectric cell 15. As will be described subsequently in greater detail, photoelectric cell 15 is mounted so as to be movable in two directions for adjustment with respect to slot 13.

Figure 3:
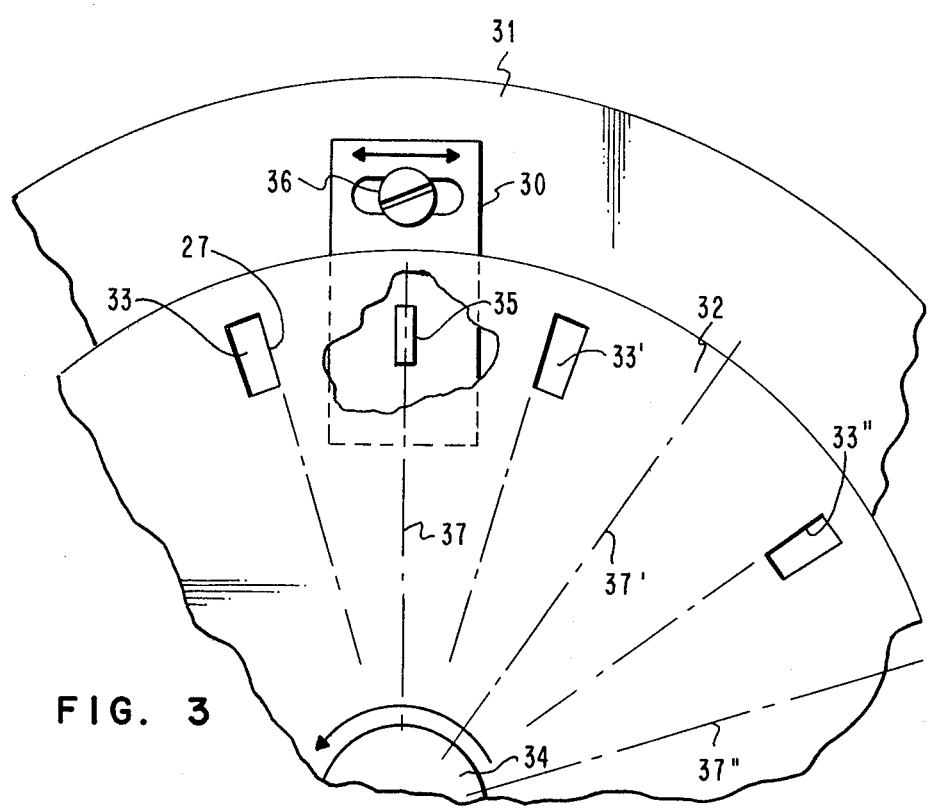
FIG. 3 is a fragmentary diagrammatic view of a portion of a prior art step motor illustrating the encoder disk and sensing means.

Before going into more specific details of the encoder of the present invention, some problems encountered by prior art encoders will be briefly discussed. FIG. 3 shows a conventional "one pulse per step" closed loop step motor feedback system utilizing a single sensing means. The encoder disk 32 has a plurality of slots 33 and means (not shown) for transmitting light through these slots. Sensing means 30 comprising photoelectric cell 35 and sliding channel and pin mounting means 36 are mounted on step motor frame 31 so as to be adjustable in the lateral directions shown by the arrow. In the case where the step motor shaft 34 on which disk 32 is mounted rotates in one direction only e.g., the clockwise direction, sensing means 30 may be moved laterally as shown by the arrows with respect to leading edge 27 of slot 33 for lead angle adjustment. For purposes of this description, we will consider the lead angle as simply the number of degrees in advance of (in lead of) a given detent position at which the phase switch is to take place. The detent position will in effect be the equilibrium position. In most step motors this will be the position where the rotor is in alignment with the stator for a particular step. For purposes of illustration, the detent positions in the rotation of step motor shaft 34 are indicated by lines 37, 37' or 37". In the illustration of FIG. 3, detent position 37 is in the vertical position; and in subsequent steps, detent position 37' and 37" will be stepped so that they are alternately in the present vertical position of detent 37.

Figure 4:
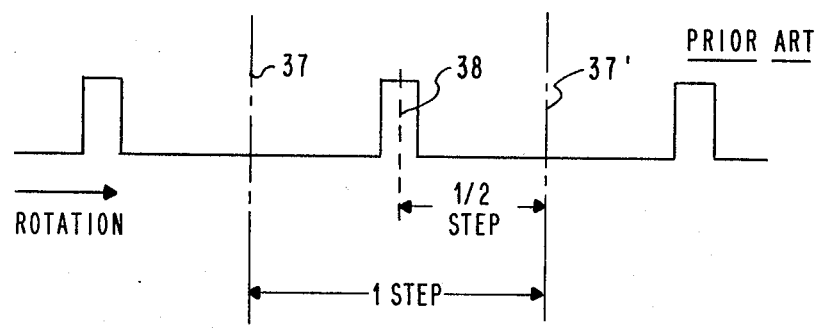
FIG. 4 is a timing diagram illustrating the position of the sensed pulses in the prior art apparatus of FIG. 3.

In normal step motor unidirectional operation, let us assume that shaft 34 is rotating in the counterclockwise direction indicated. Since photoelectric cell 35 is positioned half way between adjacent slot 33 and 33' in the encoder disk, the conventional lead angle will be one-half step. As the motor is stepped one step from detent position 37 to detent position 37', the leading edge of slot 33' will cross photoelectric cell 35 at the half way point whereupon feedback pulse 38 in the timing chart, FIG. 4 for the step motor of FIG. 3 will appear. Pulse 38 will lead detent position 37' by one-half step. Thus, the lead angle will be equal to one-half step.

In such a one directional system, the position of a particular feedback pulse such as pulse 38 with respect to detent positions may be adjusted merely by laterally shifting the position of photoelectric cell 35 through sliding pin and channel support means 36; however, this conventional, one directional system becomes substantially impractical if the apparatus of FIG. 3 is operated in the bidirectional mode. For example, if photocell 35 were shifted toward slot 33' and consequently detent position 37' in order to narrow the lead angle when step motor shaft 34 is rotating in the counterclockwise direction, then, of necessity, the distance between the initial stop position of photocell 35 with respect to slot 33 and consequently its associated detent position would be increased by a proportionate amount. Consequently, if the step motor shaft 34 were reversed so as to be rotating in the clockwise direction, the lead angle in this clockwise direction would be proportionately greater. Thus, with the single sensing means shown in the apparatus of FIG. 3, it becomes substantially impossible to adjust the lead angle for rotation at one direction without affecting the lead angle in rotation in the other direction.

The only possible mode of bidirectional operation for the apparatus of FIG. 3 would be if photocell 35 is maintained as illustrated in FIG. 3 at a point exactly half way between adjacent slots, e.g., slots 33 and 33'; in this position lead angle would remain fixed at half a step in either direction of rotation. However, such apparatus is impractical for most step motor system operations in that it permits no variation in the lead angle. Further, it does not even permit minor adjustments in the lead angle to be made to compensate for variations in the operational specifications of the step motor system.

Figure 5:
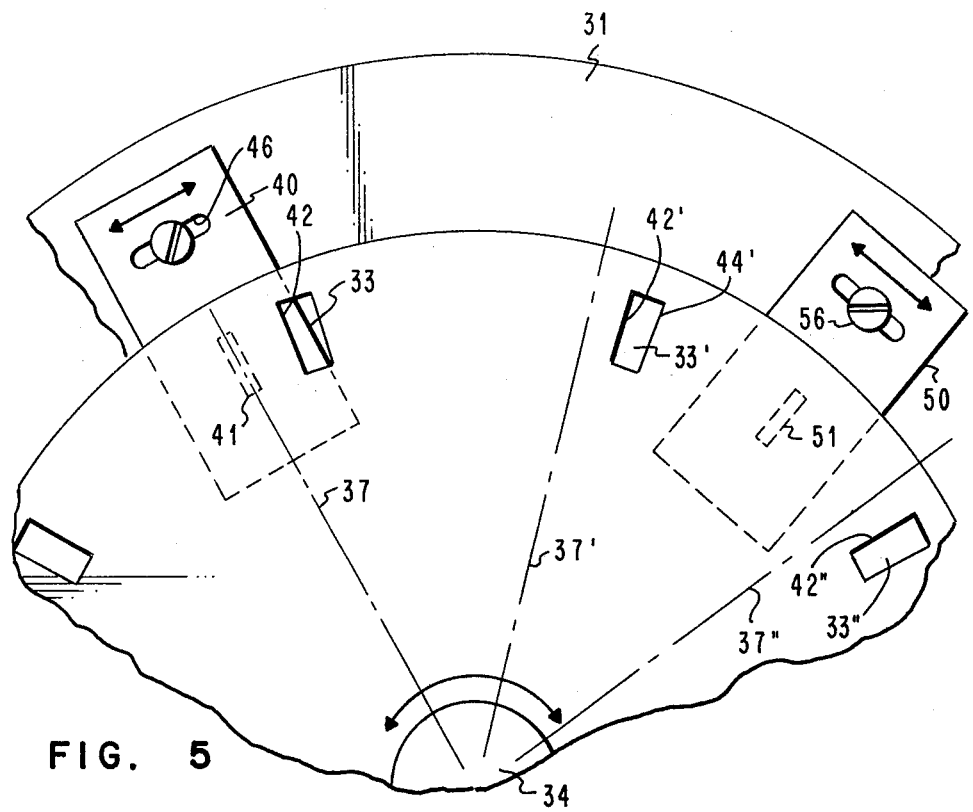
FIG. 5 is a fragmentary diagrammatic view of another type of prior art step motor apparatus portion illustrating the relationship between the encoder disk and sensing means.

Accordingly, in bidirectional step motor systems, the art is utilizing a pair of sensor means as shown in FIG. 5. The sensor means which are mounted on step motor frame 31 comprise a pair of sensing means 40 and 50 each respectively having substantially the same structure as the sensing means shown in FIG. 3 with photoelectric cells 41 and 51 respectively and sliding channel and pin means 46 and 56 for respective lateral adjustment. Thus, when the shaft 34 is rotating in the counterclockwise direction, photoelectric cell 41 is activated. This cell senses the leading edges 42, 42' and 42", respectively of slots 33, 33' and 33". At the initial position shown in FIG. 5 photoelectric cell 41 is at initial detent position 37 and the leading edge 42 of slot 33 will traverse photocell 41 very early in the step to produce feedback pulse 43 as shown in the timing diagram for counterclockwise operation in FIG. 6. Thus, the lead angle will be a substantial portion, i.e., about 90% of the step to the next detent position 37'.

Figure 6:
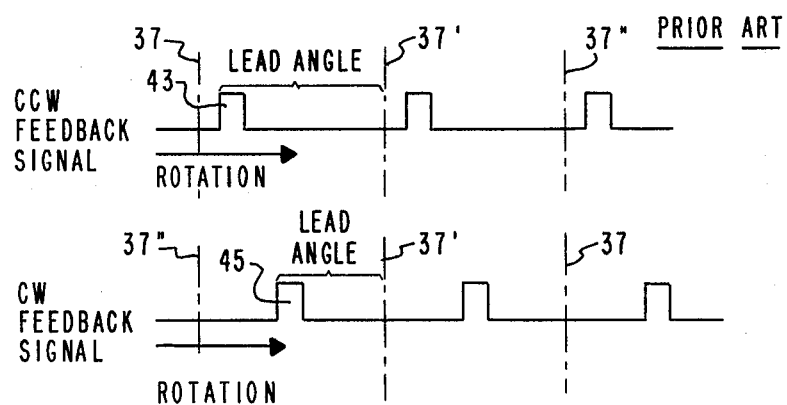
FIG. 6 is a timing chart of the apparatus of FIG. 5 illustrating the positions of the feedback pulses when the apparatus is rotating in the counterclockwise and clockwise directions.

On the other hand, with the sensing means in the position shown in FIG. 5, when step motor shaft 34 is rotated in the clockwise direction, leading edge 44' of slot 33' will cross photoelectric cell 51 to produce feedback pulse 45 shown in the timing diagram of FIG. 6 to form a lead angle of a little more than half of a step. With the apparatus of FIG. 5, since photocells 41 and 51 are each independently movable laterally through their respective sliding channels and pins 46 and 56, the lead angle in one direction can be adjusted independently of the lead angle in the other direction. The apparatus is capable of relatively close adjustments to provide the same lead angle of any selected value in both the clockwise and counterclockwise rotational direction for the step motor.

Figure 7:
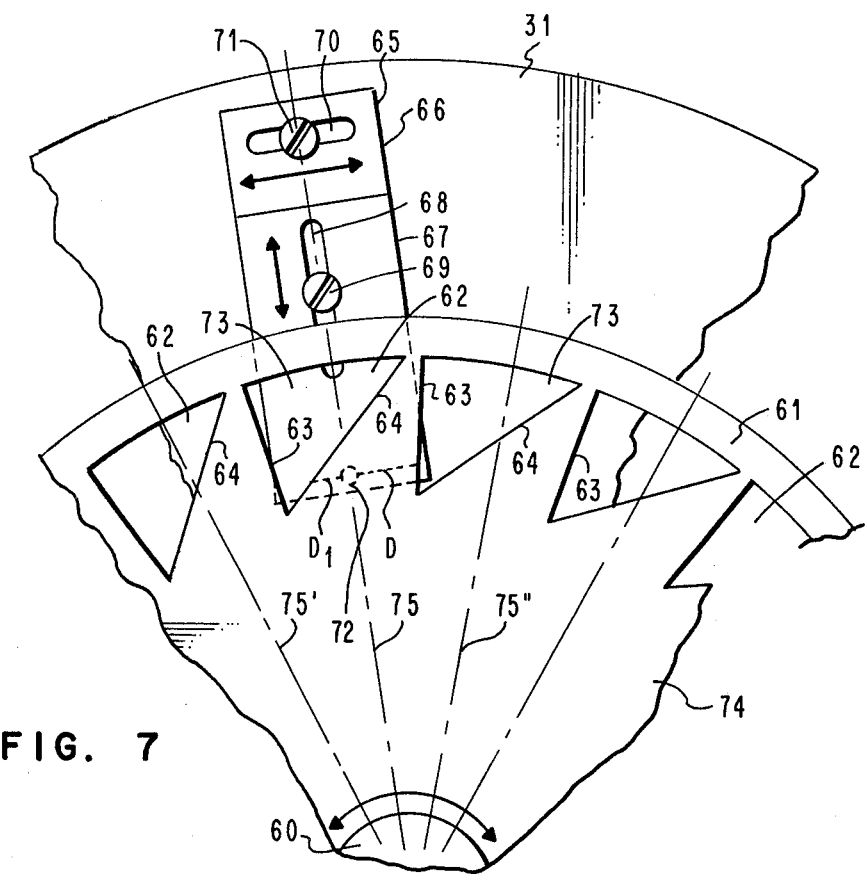
FIG. 7 is a fragmentary diagrammatic view of a portion of a step motor showing the relationship of the encoder disk to sensing means in the preferred embodiment of the present invention.

The uniquely shaped encoder disk slot configuration of the present invention in combination with sensing means which are adjustable in two directions make it possible to use a single sensing means to provide pulse feedback in a bidirectional step motor closed loop control system. The sensing means is independently adjustable to provide variable lead angles irrespective of the direction of rotation. With reference to FIG. 7, step motor in frame 31 operates rotationally about shaft 60. Slots 62 on encoder disk 61 have a unique configuration. Each of the slots has a first edge 63 which is radial and a second edge 64 which is non-radial and preferably intersects edge 63. The sensing means 65 has a structure like the sensing means mentioned in FIGS. 1 and 2. Bracket 66 is afixed to the frame 31 of the step motor. Bracket 67 is slidably mounted on bracket 66 through the combination of channel 68 and pin 69 in the direction indicated by the arrows which is radial to the axis of rotation of step motor shaft 60. Likewise, through the combination of channel 70 and pin 71, sensing means 65 is movable in the direction indicated by the arrow which is in an arc of a circle concentric with the axis of rotation of shaft 60. With these two adjustments, photoelectric cell 72 may be positioned so as to adjust the lead angles in the clockwise and counterclockwise directions independently. First, in making the adjustments of the lead angle for counterclockwise rotation of the step motor, channel 70 and pin 71 are moved so as to select the distance D from photocell means 72 mounted on bracket 67 to edge 63 which is to be the leading edge of sensing slot 73 of encoder 74 when the stepper shaft 60 is rotating in the counterclockwise direction. Distance D is in effect an angular distance, i.e., the angle between radial edge 63 and the radius from photoelectric cell 72 to the axis of rotation of shaft 60.

Next, in making lead angle adjustments for clockwise rotation, photoelectric cell 72 may be moved radially through channel 68 and pin 69 to select a position for the photoelectric cell where the distance $D_1$ from the cell to non-radial edge 64 (which will be the leading edge in clockwise rotation) provides the desired lead angle. It should be noted that because this movement of cell 72 is radial, the angle between the radius along which cell 72 is being moved and radial edge 63 remains the same and consequently the previously adjusted angular distance D stays constant.

Figure 8:
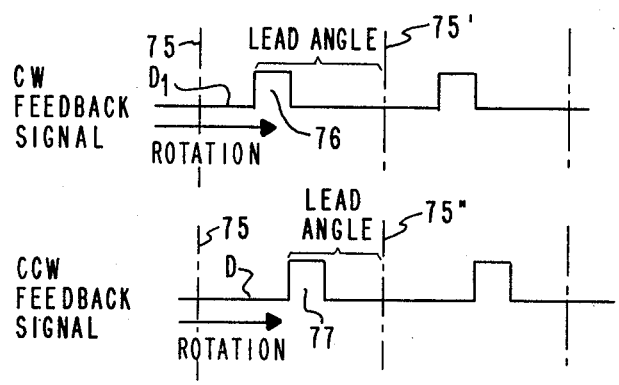
FIG. 8 is a timing chart for the apparatus of FIG. 7 showing the relative positions of the feedback pulses when the apparatus is rotating in the clockwise and in the counterclockwise directions.

In this manner, the distances D and $D_1$ which determine the lead angles respectively in the counterclockwise and clockwise directions remain constant. The independence of this lead angle adjustment with a single sensing means is illustrated with respect to the timing diagram in FIG. 8. Assuming an initial position wherein detent position 75 is for purposes of this illustration aligned with photoelectric cell 72, then in carrying out a step in the clockwise direction from detent position 75 to detent position 75' after a distance of $D_1$ has been traversed, photocell 72 will cross leading edge 64 of slot 73 to produce feedback pulse 76, FIG. 8. The produced lead angle is indicated in FIG. 8 from pulse 76 to the next detent position 75'.

On the other hand, when step motor shaft 60 is rotated in the counterclockwise direction in a step from detent position 75 to detent 75'', photoelectric cell 72 is crossed by leading edge 63 of slot 73 after the angular distance D has been traversed. This results in feedback pulse 77 and the lead angle shown in the timing chart of FIG. 8 between the commencement of pulse 77 and detent position 75''.

Since for most printer functions, the lead angle is desirably equal in both the clockwise and counterclockwise directions of rotation, the position of photoelectric cell 72 is first adjusted with respect to slot edge 63 until the distance D provides the desired lead angle. Then, photoelectric cell 72 is moved radially until $D_1$ is equal to D.

With this arrangement, the equipment operates with equal lead angles. However, the operator still has the ability of making minor adjustments in the position of the sensing means to compensate for the effects of transient variations in the equipment on the lead angle in one direction without altering the lead angle in the other direction. In addition, this apparatus may be advantageously used in step motors using vertical lead screws where lead angle differences in the two directions are required.

Figure 9:
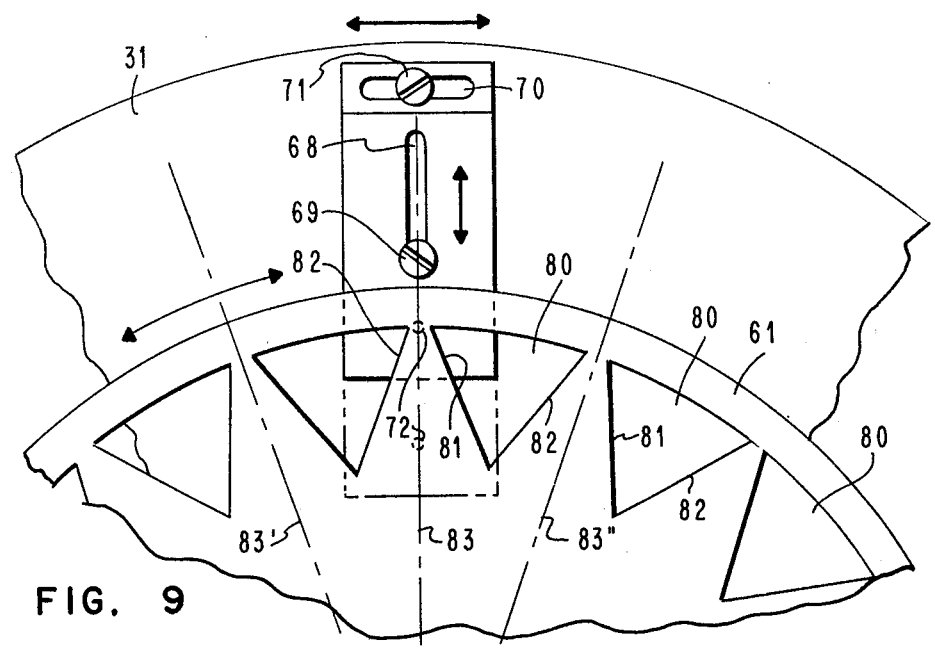
FIG. 9 is a fragmentary diagrammatic view of a portion of a step motor showing the relationship of the encoder disk to the sensing means in apparatus according to another aspect of the present invention.
Figure 10:
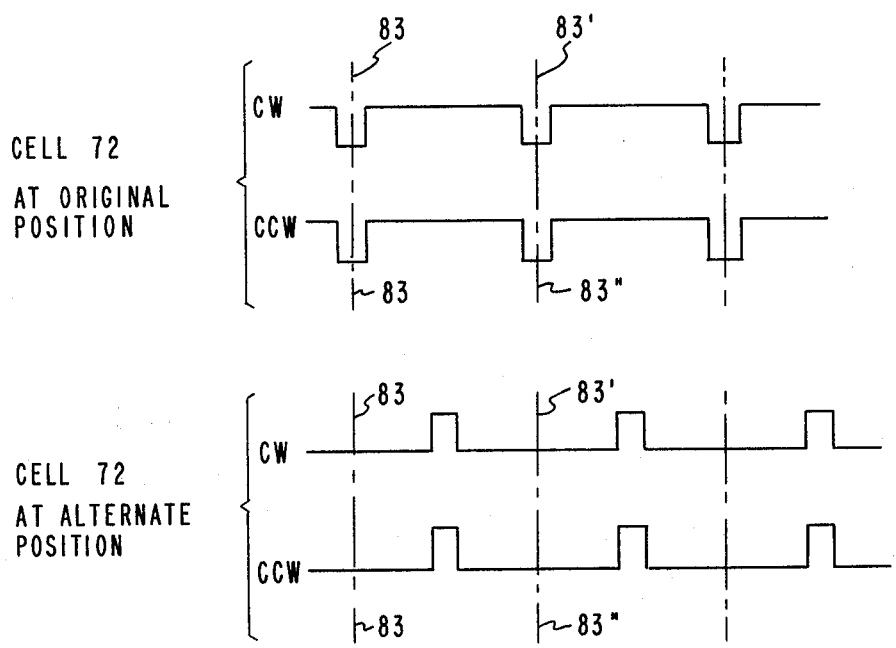
FIG. 10 is a timing chart of the apparatus of FIG. 9 illustrating positioning of the feedback pulses when the apparatus is rotating in the clockwise and counterclockwise directions for each of two positions of the adjustable sensing means.

Another aspect of the present invention provides a structure in which lead angles in both directions are always equal but may be varied. A single sensing means may be used for feedback in a closed loop step motor system where the slots have no edges which are radial to the axis of rotation. However, in such an alternate structure, while the lead angles may be varied, the lead angle in the clockwise direction will equal the lead angle in the counterclockwise direction. In the apparatus of FIG. 9, sensing slots 80 have a configuration wherein edges 81 and 82 are equal in size thereby forming an isosceles triangle. The lateral or arcuate adjustment means provided by channel 70 and pin 71 is used primarily to move photoelectric cell 72 to a position which is equidistant from sides 81 and 82. Once this is set, then by moving photoelectric cell 72 radially by means of channel 68 and pin 69, the distance between the photoelectric cell 72 and adjacent sides 81 and 82 may be varied to thereby vary the lead angle to the same extent in each direction of rotation. The timing graphs in FIG. 10 illustrate the pulse formation when with photocell 72 at an original position and then at an alternate position designated in phantom lines and designated 72', the step motor and consequently encoder disk 61 is rotated from an initial detent position 83 one step in the clockwise direction to detent position 83' and then in the reverse direction from detent position 83' counterclockwise to detent position 83''.

As previously mentioned, the structure of the present invention is equally applicable to closed loop linear step motors. In such a case, slots 73 of FIG. 7 would have the same configuration except that they would be arranged along a rectilinear path on a slotted tape in place of a slotted disk. Edges 63 would be perpendicular to the path of movement of the slotted tape and spaced an equal distance from each other. The slotted tape would move in synchronization with the movement of the linear step motor. In such a structure, a single photoelectric cell such as photoelectric cell 72 in FIG. 7 could be used. Then, in effecting feedback positional adjustment for the photoelectric cell, it first would be adjusted with respect to edge 63 and then moved along a path perpendicular to the path of movement of the tape until the photoelectric cell would be at the desired distance from edge 64.

While the invention has been particularly shown and described with reference to a particular embodiment, it will be understood by those skilled in the art that various changes in form and detail may be made without departing from the spirit and scope of the invention.

What is claimed is:

1. In a rotational encoder apparatus having a plurality of indicia at fixed positions with respect to each other, means for rotating said indicia about an axis and means for sensing said indicia positioned along the path of rotation of said indicia, the improvement wherein each of a plurality of said indicia has a first edge radial to said axis and traversing said path of rotation and a second edge non-radial to said axis, traversing said path of rotation, and further including means for moving said sensing means so that the position of said sensing means may be adjusted with respect to said first edges which are the leading edges when said indicia are rotated in one direction and to said second edges which are the leading edges when said indicia are rotated in the opposite direction.

2. The apparatus of claim 1 wherein said means for moving said sensing means comprises means for moving said sensing means radially to said axis in order to vary the position of said sensing means with respect to said second edges, and means for moving said sensing means in an arc concentric with said path of rotation in order to vary the position of said sensing means with respect to said first edges.

3. The apparatus of claim 2 wherein said first and second edges intersect.

4. The apparatus of claim 2 or claim 3 wherein said indicia are optical indicia and said sensing means is an optical sensing means.

5. In a rotational encoder apparatus having a plurality of indicia at fixed positions with respect to each other, means for rotating said indicia about an axis and means for sensing said indicia positioned along the path of rotation of said indicia, the improvement wherein each of a plurality of said indicia has first and second non-parallel edges non-radial to said axis and traversing said path of rotation, and further including means for moving said sensing means so that the position of said sensing means may be adjusted with respect to said first edges which are the leading edges when said indicia are rotated in one direction and to said second edges which are the leading edges when said indicia are rotated in the opposite direction.

6. The apparatus of claim 5 wherein said means for moving said sensing means include means for moving said sensing means radially to said axis, and means for moving said sensing means in an arc concentric with said path of rotation.

7. The apparatus of claim 6 wherein said first and second edges intersect.

8. The apparatus of claim 6 or claim 7 wherein said indicia are optical indicia and said sensing means is an optical sensing means.

9. In a closed loop bidirectional step motor system comprising a bidirectional step motor rotating through each motor revolution in a predetermined number of equal steps, an encoder rotating in synchronization with said step motor and having a plurality of indicia each respectively corresponding to at least a fixed portion of a motor step and means for sensing said indicia positioned along the path of rotation of said indicia, the improvement wherein each of said indicia has a first edge radial to the axis of said path of rotation and traversing said path and a second edge non-radial to said axis, traversing said path, and further including means for moving said sensing means so that the position of said sensing means may be adjusted with respect to said first edges which are the leading edges when said indicia are rotated in one direction and to said second edges which are the leading edges when said indicia are rotated in the opposite direction whereby the lead angle of said sensing means may be adjusted for each direction of rotation of said step motor.

10. The step motor system of claim 9 wherein each of said indicia corresponds to a full motor step.

11. The step motor system of claim 9 or claim 10 wherein said means for moving said sensing means comprises means for moving said sensing means radially to said axis in order to vary the position of said sensing means with respect to said second edges, and means for moving said sensing means in an arc concentric with said path of rotation in order to vary the position of said sensing means with respect to said first edges.

12. The step motor system of claim 11 wherein said first and second edges intersect.

13. The step motor system of claim 11 wherein said indicia are optical indicia and said sensing means is an optical sensing means.

14. In a closed loop bidirectional step motor system comprising a bidirectional step motor rotating through each motor revolution in a predetermined number of equal steps, an encoder rotating in synchronization with said step motor and having a plurality of indicia each respectively corresponding to at least a fixed portion of a motor step and means for sensing said indicia positioned along the path of rotation of said indicia, the improvement wherein each of said indicia has first and second non-parallel edges non-radial to the axis of said path of rotation and traversing said path, and further including means for moving said sensing means so that the position of said sensing means may be adjusted with respect to said first edges which are the leading edges when said indicia are rotated in one direction and to said second edges which are the leading edges when said indicia are rotated in the opposite direction whereby the lead angle of said sensing means may be adjusted for each direction of rotation of said step motor.

15. The step motor system of claim 14 wherein each of said indicia corresponds to a full motor step.

16. The step motor system of claim 14 or claim 15 wherein said means for moving said sensing means include means for moving said sensing means radially to said axis, and means for moving said sensing means in an arc concentric with said path of rotation.

17. The step motor system of claim 16 wherein said first and second edges intersect.

18. The step motor system of claim 16 wherein said indicia are optical indicia and said sensing means is an optical sensing means.

19. In an encoder apparatus having a plurality of indicia at fixed positions with respect to each other, means for moving said indicia along a directional linear path and means for sensing said indicia positioned along said path, the improvement wherein each of a plurality of said indicia has a first edge perpendicular to said path and traversing said path and a second edge non-perpendicular to said path traversing said path, and further including means for moving said sensing means so that the position of said sensing means may be adjusted with respect to said first edges which are the leading edges when said indicia are moved in one direction and to said second edges which are the leading edges when said indicia are moved in the opposite direction.

20. The apparatus of claim 19 wherein said means for moving said sensing means comprises means for moving said sensing means perpendicular to said path in order to vary the position of said sensing means with respect to said second edges, and means for moving said sensing means parallel to said path in order to vary the position of said sensing means with respect to said first edges.

21. In a closed loop bidirectional step motor system comprising a bidirectional step motor moving in a number of equal steps, an encoder moving in synchronization with said step motor and having a plurality of indicia each respectively corresponding to at least a fixed portion of a motor step and means for sensing said indicia positioned along the path of said indicia, the improvement wherein each of said indicia has a first edge perpendicular to said path and traversing said path and a second edge non-perpendicular to said path traversing said path, and further including means for moving said sensing means so that the position of said sensing means may be adjusted with respect to said first edges which are the leading edges when said indicia are moved in one direction and to said second edges which are the leading edges when said indicia are moved in the opposite direction whereby the lead angle of said sensing means may be adjusted for each direction of movement of said step motor.

22. The step motor system of claim 21 wherein each of said indicia corresponds to a full motor step.

23. The step motor system of claim 21 or claim 22 wherein said means for moving said sensing means comprises means for moving said sensing means perpendicularly to said path in order to vary the position of said sensing means with respect to said second edges, and means for moving said sensing means parallel to said path in order to vary the position of said sensing means with respect to said first edges.

* * * * *

UNITED STATES PATENT AND TRADEMARK OFFICE
CERTIFICATE OF CORRECTION

PATENT NO. : 4,289,983

DATED : September 15, 1981

INVENTOR(S) : Lutz H. O. Bengner, Wallace E. Kee, Raymond D. Mathews, Stephen T. Olson It is certified that error appears in the above-identified patent and that said Letters Patent are hereby corrected as shown below:

On the title page, Items [19] and [75] the First Inventor's last name should read --- Bengner ---.

Signed and Sealed this

Fourth Day of May 1982

[SEAL]

*Attest:*

*Attesting Officer*

GERALD J. MOSSINGHOFF

*Commissioner of Patents and Trademarks*